Aug. 14, 1923.
R. K. THOMSON
AUTOMOBILE CURTAIN
Filed June 19, 1919
1,464,549
3 Sheets-Sheet 1
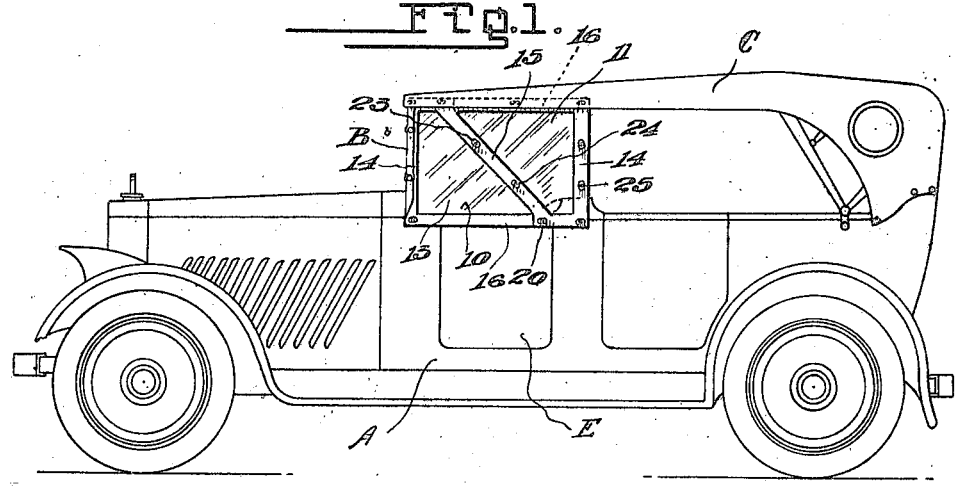
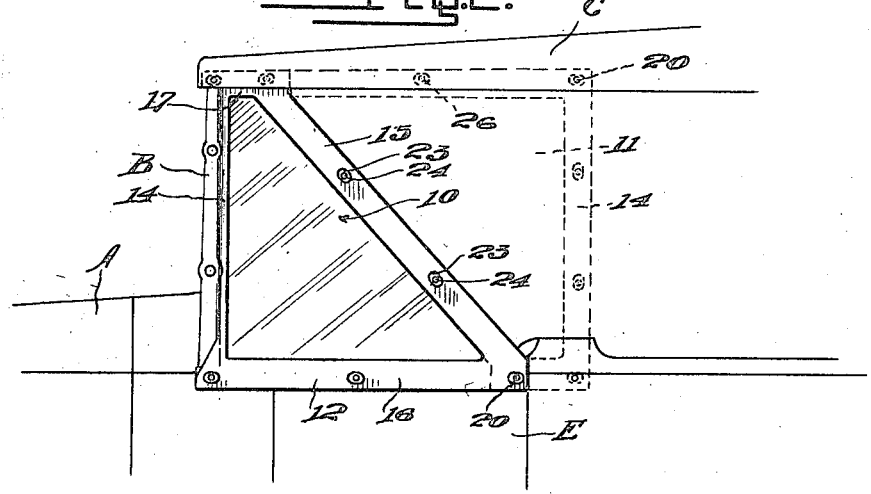
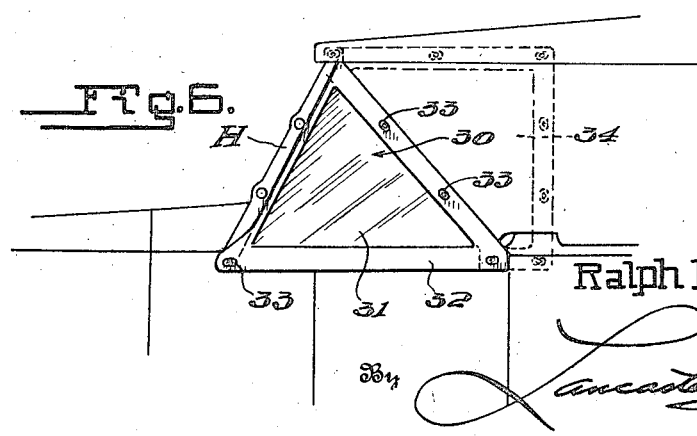
Inventor
Ralph K. Thomson
By Lancaster Allwine
his Attorneys

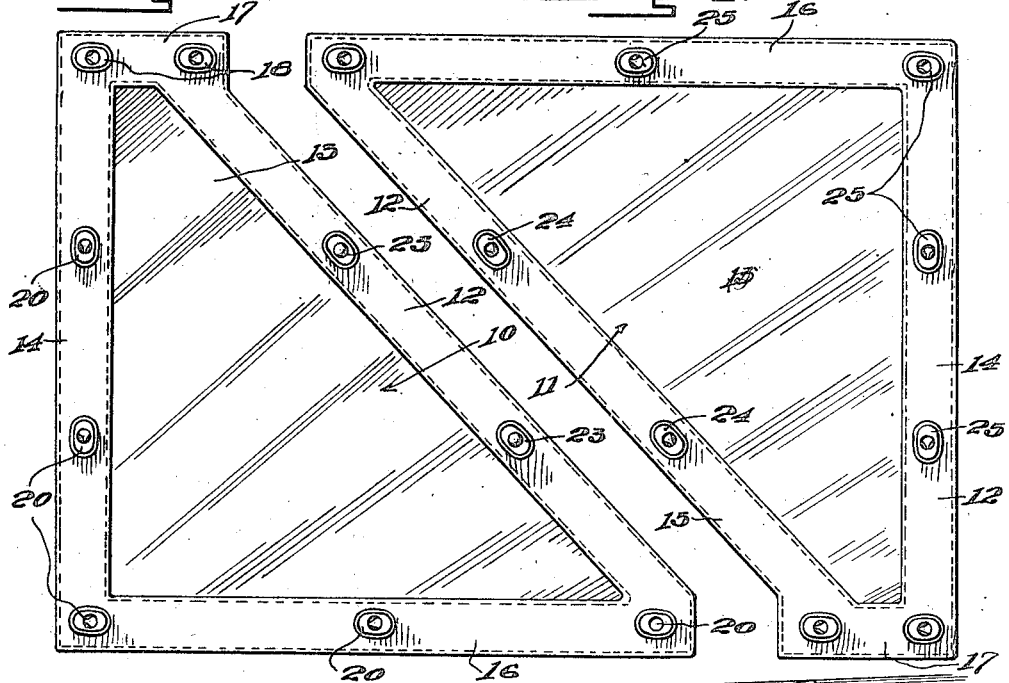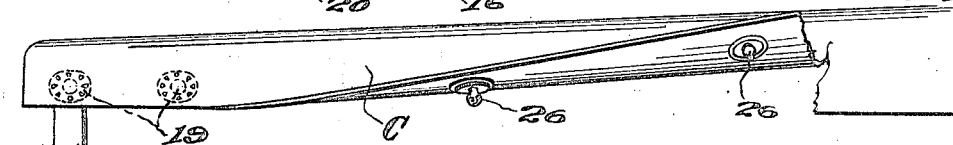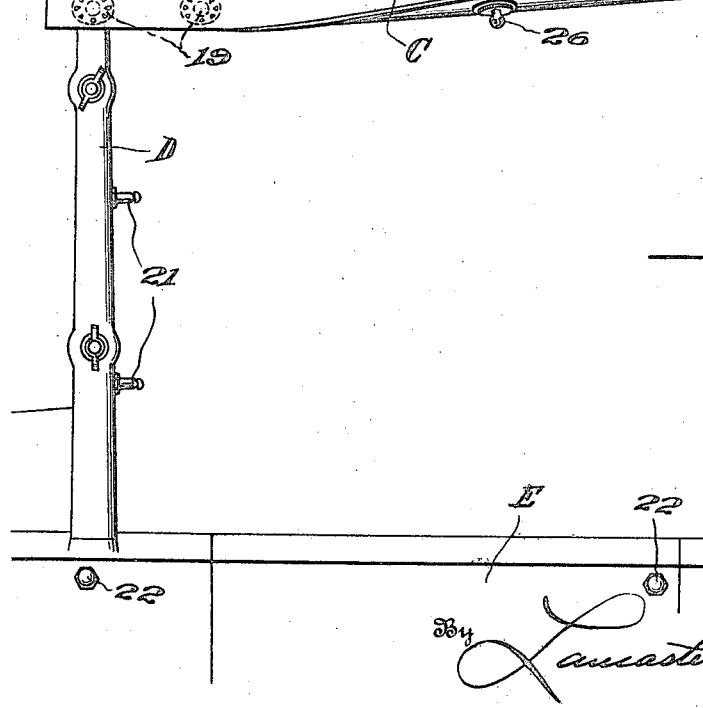

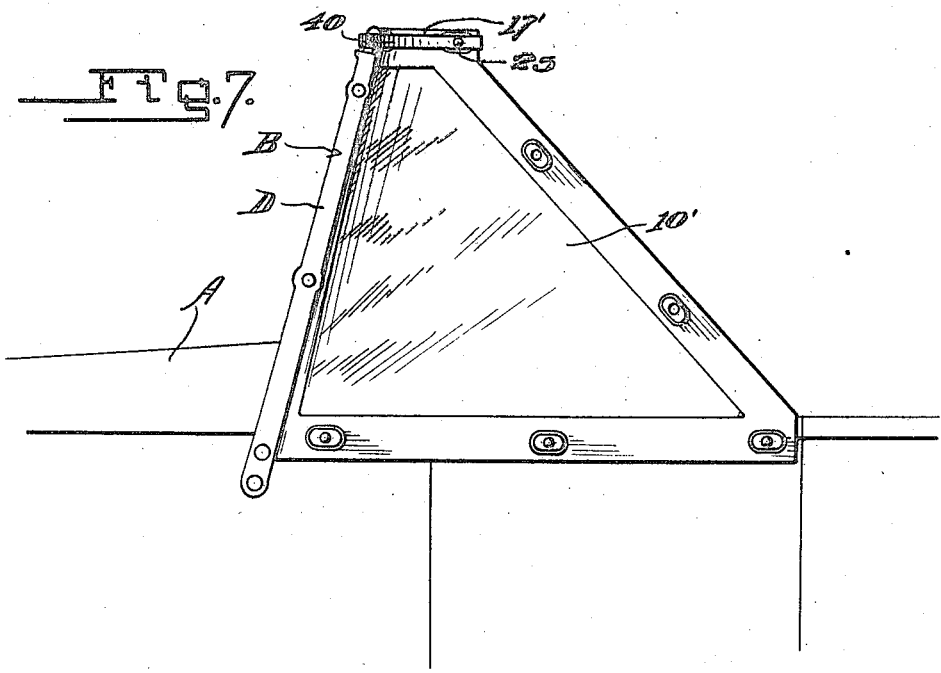
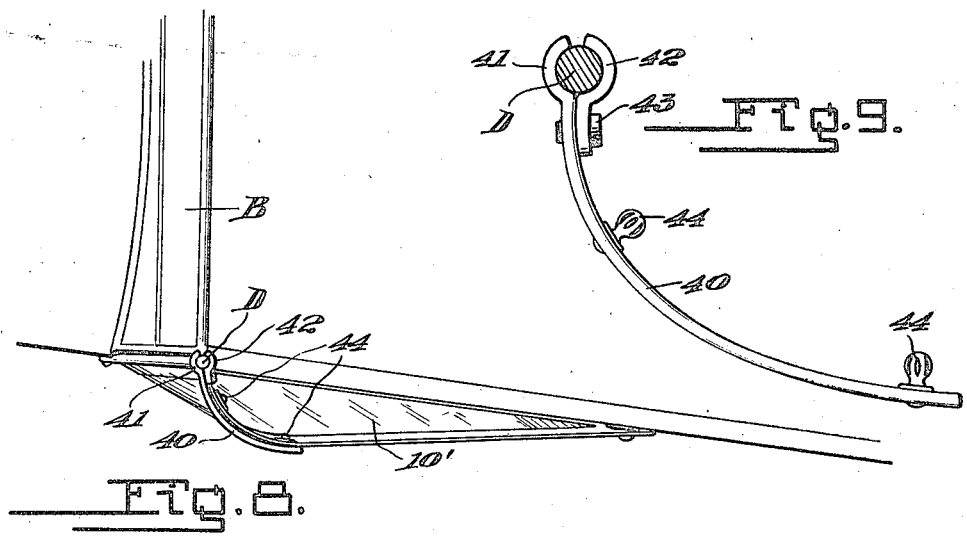

Patented Aug. 14, 1923.

1,464,549

UNITED STATES PATENT OFFICE.

RALPH K. THOMSON, OF SIOUX FALLS, SOUTH DAKOTA.

AUTOMOBILE CURTAIN.

Application filed June 19, 1919. Serial No. 305,300.

*To all whom it may concern:*

Be it known that I, RALPH K. THOMSON, a citizen of the United States, residing at Sioux Falls, in the county of Minnehaha and State of South Dakota, have invented certain new and useful Improvements in Automobile Curtains, of which the following is a specification.

This invention relates to side curtains for automobiles, and an object of the invention is to provide side curtains for automobiles which will protect the driver or chauffeur of the vehicle, from weather, such as rain, wind which might be blown upon him, during travel, but which will permit a clear vision to each side of the motor vehicle, materially reducing liability of accident.

Another object of the invention is to provide side curtains for automobiles or analogous vehicles, which are substantially triangular in shape, and are attached to the side supporting standards of the wind shield of the vehicle and the door, being adapted to swing outwardly with the door to permit entrance into or passage from the vehicle, which side curtain, will, without hampering the views to each side of the vehicle, of the driver thereof, protect him from wind and dust, as well as from cold, and also to provide a second substantially triangular section of curtain which may be attached to the vehicle body and top and to the rear inclined edge of the forward substantially triangular section, to completely enclose the front portion of the vehicle to protect the driver from rain, snow or the like.

A further object of the invention is to provide supporting bars, curved to conform to the structure of the front end of the top of the vehicle, which bars may be attached to the upper edge of the side standards of the wind shield, and form means to support the upper end of the substantially triangular shaped side curtains, when the top of the vehicle is lowered, thereby permitting use of the side curtain, for coaction with the wind shield to protect the driver of the vehicle as well as other persons on the front seat thereof, from wind, dust or cold during driving.

Other objects of the invention will appear in the following detailed description taken in connection with the accompanying drawings forming a part of this specification and in which drawings:

Figure 1 is a side elevation of a motor vehicle showing the improved side curtains applied.

Figure 2 is a fragmentary side elevation of the automobile, having a straight or verticle wind shield showing the forward substantially triangularly shaped side curtain attached thereto.

Figure 3 is a side elevation of one of the substantially triangularly shaped side curtains.

Figure 4 is a side elevation of the other substantially triangularly shaped side curtain which co-acts with the side curtain illustrated in Figure 3 to completely enclose the side of the forward end of the vehicle.

Figure 5 is a detailed view of a motor vehicle, showing a part of the top broken and turned up, to expose the fasteners utilized for attaching the improved side curtains to the vehicle.

Figure 6 is a fragmentary side elevation of a motor vehicle having an inclined wind shield, showing the modified form of the substantially triangularly shaped side curtains connected thereto.

Figure 7 is a fragmentary side elevation of an automobile having an inclined wind shield, illustrating the manner of attaching the forward substantially triangularly shaped side curtains, to the vehicle, when the top thereof is lowered.

Figure 8 is a fragmentary top plan of a structure illustrated in Figure 7, and

Figure 9 is an enlarged top plan of the supporting bar for the upper end of the side curtain, which supporting bar is attached to the upper end of the one side post of the wind shield, of the motor vehicle.

Referring more particularly to the drawing, A indicates an automobile of any approved form, the wind shield B of which is vertical or straight and with automobile A has the usual type of top C. The improved side curtains, as illustrated in Figures 1 to 4 inclusive, are substantially triangular in shape, and it will be noted, that the side curtains 10 and 11, are of identical shape, so that they may be interchanged one with the other. These side curtains 10 and 11 each comprise an outer frame 12 which is constructed of leather, or rubberized fabric as is ordinarily used in the construction of side curtains and they have transparent panels 13, of transparent material, such as celluloid. These side curtains 10 and 11 are substantially in shape of a right angle triangle, providing a straight side 14, hypotenuse or angled side 15 and a second straight side 16. The relatively short straight portion 17 is provided upon each of the side curtains and it connects the hypotenuse 15 thereof with the straight side 14. The side curtain 10, which is illustrated as used as the forward curtain has this straight portion 17 positioned upwardly, and carries socket sections 18 of ordinary snap fasteners which are adapted to co-act with the inserting section 19 of the snap fasteners which are carried by the forward end of the downwardly extending side portion of the top. The straight sides 14 and 16 of the side curtain 10 also have attached thereto at spaced intervals receiving or socket sections 20 of snap fasteners which are adapted to co-act with inserting sections 21 carried by the side post D of the wind shield B. These inserting sections 21 are attached to the rear side of the post D and the edge 14 is bent, substantially at right angles as clearly shown in Figures 1 and 2 of the drawing for attachment to the wind shield B to the automobile A. The fastener section 20 carried by the lower straight side 16 of the courtain 10, co-acts with inserting member 22 carried by the body of the vehicle. One of the inserting members 22 is carried by the door of the automobile A, and this co-acts with the fastener 20 at the lower rear corner of the curtain 10, so as to permit the curtain to swing with the door E, to permit a person to enter or leave the automobile without detaching the curtain 10. The hypotenuse or angled side 15 of the curtain 10 carries inserting sections 23, of snap fasteners which are adapted to co-act with receiving sections 24 carried by the hypotenuse or angled side 15 of the curtain 11, to permit the connecting of the diagonal sides of the curtains 10 and 11 when it is desired to completely enclose the front portion of the automobile. The straight sides 14 and 16, as well as the straight portion 17 of the curtain 11 all have attached thereto at spaced intervals receiving sections 25 of snap fasteners, which are adapted to co-act with inserting sections 26 carried by the top C and body of the motor vehicle. The forward curtain, illustrated in the drawing as the curtain 10, may be maintained attached to the automobile at all times, for protecting the chauffeur or driver from wind, dust, or cold, while the rear curtain is only used during rain, snow or extremely cold weather. Owing to the similarity of the construction of the curtains 10 and 11, they may be interchanged, so that one of them becomes worn so as to be noticeable, the other may be used to replace it, so as to cause substantially the same wear upon the two sections of the side curtains to maintain the proper appearance of the sections.

In using the side curtains upon motor vehicles, having slanting or inclined wind shields as shown at H, in Figure 6 of the drawing, it is necessary to alter the configuration of one or both of the side curtains. In the example shown the side curtain 30 illustrated in Figure 6, is particularly designed for use on motor vehicles of this type, it having all of its sides positioned at acute angles with respect to each other, to properly fit the wind shield at the forward end of the motor vehicle. This modified form of the forward section of the wind shield, includes the transparent panel 31 and the reinforcing or binding frame 32, constructed of desired material and carrying snap fasteners 33 for co-action with their companion sections carried by the automobile to permit the attachment of the modified form of curtain with the automobile. A curtain, 34 as indicated in dotted lines in Figure 6 of the drawing which is identical in construction to either of the side curtains 10 or 11 may be used in connection with the modified form of the curtain 30 for completely enclosing the sides of the front portion of the motor vehicle having the inclined wind shield B.

At times, it will be desirable to use the improved side curtains upon the automobile when the top C is folded or lowered, and at such times it is necessary to provide means for supporting the upper end of the forward side curtain. In Figures 7, 8, and 9 of the drawings, means for supporting the upper portion of the side curtains is shown. This means comprises a rod 40 shaped to conform to the shape of the forward end of the top C of the motor vehicle and having one end rounded to provide a clamping jaw 41 adapted to engage about a portion of one of the side posts D of the wind shield B. A second clamping jaw 42 is provided, which is connected to the rod 40 by means of a thumb screw 43, which thumb screw may be loosened, to permit detaching the rod 40 or tightened to securely clamp the jaws 41 and 42 into engagement with the side posts D. This arcuate rod 40, one of which is attached to each of the side posts of the wind shield, has the inserting members 44 of snap fasteners, thereon, which are adapted to co-act with the receiving portions 18 carried by the straight portion 17, of the side curtain 10'. While the side curtain 10' shown in Figure 7 differs slightly in shape, from the side curtain shown in Figures 1, 2 and 3, it should be understood that the arcuate supporting bars 40 may be used with the side curtains 10 or 11, if desired, or with side curtains of analogous structure, it being necessary to slightly alter the shape of the side curtains to fit the various types of vehicles, as well as to provide various sizes of side curtains to fit different makes of automobiles.

It is to be understood, that the substantially triangularly shaped side curtains may be provided with a plurality of transparent panels, if desired, so as to permit them to be folded for storing, and that other changes in details may be made without departing from the spirit of this invention.

I claim:

1. The combination with an automobile including a wind shield having a side post, of a substantially triangularly shaped side curtain including a relatively short straight portion connecting two sides of said curtain, an arcuate bar detachably connected to the post of said wind shield, fastening means carried by said arcuate bar, and fastening means carried by said relatively short straight portion for co-action with said bar carried fastening means.

2. The combination with an automobile including a wind shield having a side post, of a substantially triangularly shaped side curtain including a relatively short straight portion connecting two sides of said curtain, an arcuate bar detachably connected to the post of said wind shield, fastening means carried by said arcuate bar, and fastening mean carried by said relatively short straight portion for co-action with said bar carried fastening means, fastening means carried by one side of said curtain, and fastening means carried by said wind shield for co-action with said last named fastening means.

3. The combination with an automobile including a wind shield having a side post, of a substantially triangularly shaped side curtain including a relatively short straight portion connecting two sides of said curtain, an arcuate bar detachably connected to the post of said wind shield, fastening means carried by said arcuate bar, and fastening means carried by said relatively short straight portion for co-action with said bar carried fastening means, fastening means carried by one side of said curtain, fastening means carried by said wind shield for co-action with said last named fastening means, and means for detachably connecting said arcuate bars to said wind shield.

4. The combination with an automobile including a wind shield, having a side post, and a hinged door, of a substantially triangularly shaped side curtain having a relatively short straight portion connecting two sides thereof, fastening means carried by one side of said side curtain, fastening means carried by the side post of said wind shield for co-action with said curtain carried fastening means to attach the curtain to the wind shield, fastening means carried by the door, fastening means carried at one corner of the curtain for co-action with said door carried fastening means to attach the curtain to the door whereby the curtain will swing with the door, an arcuate bar, means for detachably connecting said arcuate bar to the said post of said wind shield, fastening means carried by said arcuate bar, and fastening means carried by said relatively short portion of the curtain for co-action with said bar carried fastening means.

5. The combination with an automobile including a wind shield, having a side post, and a hinged door, of a substantially triangularly shaped side curtain having a relatively short straight portion connecting two sides thereof, fastening means carried by one side of said side curtain, fastening means carried by the side post of said wind shield for co-action with said curtain carried fastening means to attach the curtain to the wind shield, fastening means carried by the door, fastening means carried at one corner of the curtain for co-action with said door carried fastening means to attach the curtain to the door whereby the curtain will swing with the door, an arcuate bar, means for detachably connecting said arcuate bar to the said post of said wind shield, fastening means carried by said arcuate bar, and fastening means carried by said relatively short portion for co-action with said bar carried fastening means, said side curtain having a transparent panel therein.

6. The combination with an automobile including a body, windshield and top, of a side curtain comprising two complementary separable sections, each section of substantially triangular shape and interchangeable for connection with the wind shield, body and top, with the diagonal portion extending from the top to the body.

7. An automobile side curtain comprising two complementary separable sections of the same size, each section of substantially triangular shape, and said sections provided with cooperating fastening devices for connection of said sections at their longest sides.

8. A curtain of the class described comprising a pair of cooperating substantially triangular complementary sections of the same size, adapted for relative attachment to a vehicle to form a rectangular curtain in which the sections are interchangeable with respect to their positioning upon the vehicle.

9. In combination with a vehicle including a body, windshield and top to provide a compartment, a side curtain comprising a pair of triangularly shaped detachable sections adapted for cooperative use to provide a rectangular shaped curtain for enclosing a side of said vehicle compartment, said sections being interchangeable for connection with the windshield, body and top of said vehicle, in which position the diagonal edge of a section extends from the vehicle top rearwardly and downwardly toward the body.

RALPH K. THOMSON.